Aug. 4, 1964   J. E. KRYNSKI   3,143,502
FILTER
Filed Sept. 26, 1960   2 Sheets-Sheet 1

INVENTOR
JOHN E. KRYNSKI
BY Robertson & Smythe
ATTORNEY

Aug. 4, 1964　　　J. E. KRYNSKI　　　3,143,502
FILTER
Filed Sept. 26, 1960　　　2 Sheets-Sheet 2
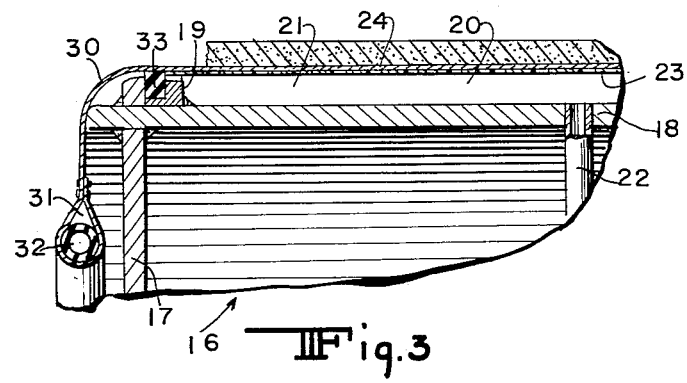
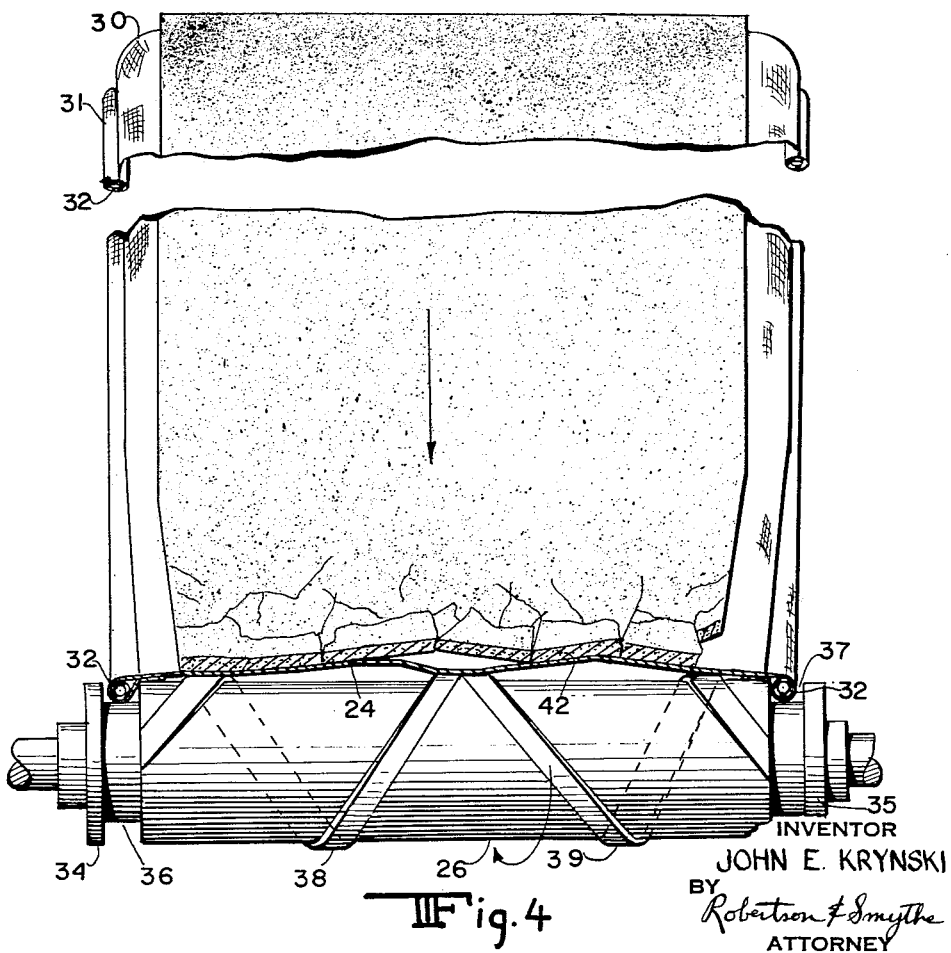
INVENTOR
JOHN E. KRYNSKI
BY Robertson & Smythe
ATTORNEY

United States Patent Office 3,143,502
Patented Aug. 4, 1964

3,143,502
FILTER
John E. Krynski, East Moline, Ill., assignor to Ametek, Inc., New York, N.Y., a corporation of Delaware
Filed Sept. 26, 1960, Ser. No. 58,402
1 Claim. (Cl. 210—401)

The present invention relates to drum type filters which employ cloth belt filtering media.

Drum type filters with cloth belt filtering media present problems of belt alignment, shrinkage, stretching and wrinkling which detract materially from the efficiency of operation of the filter.

The principal object of this invention is to provide a drum type filter in which the cloth belt filtering medium is maintained in proper alignment without the employment of auxiliary tracking equipment.

Another object of the invention is to provide such a filter in which transverse shrinking of the cloth belt will not uncover any of the edges of the drum of the filter.

Still another object of the invention is to provide such a filter in which the cloth belt is prevented from wrinkling and is maintained under proper tension transversely of the belt.

Still another object of the invention is to provide such a filter in which the cloth belt filtering medium is made up of sections joined along the selvage edges of the cloth to form a continuous belt.

Still another object of the invention is to provide such a drum filter in which the cloth belt filtering medium will accommodate width variations.

A still further object of the invention is to provide such a drum filter in which the cloth belt will find its own best position on the drum.

Another object of the invention is to provide such a drum filter in which the cloth belt will remain snugly on the drum, preventing wrinkles from developing in the cloth belt.

The filter to which the principles of the invention are applied may comprise a hollow drum mounted in bearings for rotation about a horizontal axis such that a substantial portion of the drum is submerged in a slurry bath desired to be filtered. The drum may be provided with relatively shallow compartments about its periphery, each of which is connected to an exhaust line that extends radially inwardly toward the axis of rotation of the drum. A source of subatmospheric pressure is adapted to be connected through appropriate valve means to each exhaust line only while its corresponding shallow compartment passes through the slurry to be filtered. A perforated peripheral member may surround the drum covering the shallow compartments and a continuous cloth belt may extend substantially completely about the periphery of the drum passing therefrom over a discharge roll, thence over idler rolls and back to the periphery of the drum.

In one aspect of the invention, the continuous cloth belt may be made up of sections cut from a bolt of fabric, and the selvage edges of the cut sections may be joined by sewing them together with strips of tape or otherwise forming a continuous belt with the joined selvage edges extending transversely of the belt.

In another aspect of the invention, the width of the belt may be substantially greater than the width of the drum, the discharge roll and idle rollers. Its edges may be folded over and sewn in a manner to provide a hollow seam along each edge of the belt.

In another aspect of the invention, a tensioning means may be provided along each edge of the belt, which edges are beyond the ends of the drum, discharge roll and idle rollers. The tensioning means may be a close-wound spring made continuous by a spring joiner, and may be of substantially less length than the length of the continuous belt. The tensioning means may also comprise rubber or plastic tubing, or woven cord or the like. The tensioning means may be threaded through the hollow seam on each edge of the belt and its length may be substantially less than that of the continuous belt. In this way, it will act to draw the edges of the belt that extend beyond the width of the filter drum, the discharge roll and the idler rolls radially inwardly, thereby to provide a seal between the drum edges and the belt. A rubber or plastic seal strip may extend around the periphery of the drum adjacent its edges over which the belt fits to thereby further assist in the sealing action.

In still another aspect of the invention, the discharge roll may be provided with right and lefthand helical ridges on its periphery that extend from the middle of the roll toward each end respectively.

In still another aspect of the invention, the discharge roll may be driven by a variable speed transmission so that its peripheral speed may be varied relative to that of the belt; thus, when the discharge roll is driven faster than the belt speed, right and lefthand helical grooves tend to impart a desired transverse tension to the belt.

The above, other objects and advantages of the invention will become apparent from the following specification and accompanying drawings which are merely exemplary.

In the drawings:

FIG. 3 is a sectional elevational view taken substantially along line 3—3 of FIG. 1; and FIG. 4 is an enlarged elevational view, showing certain details of the apparatus of FIG. 2.

Figure 1:
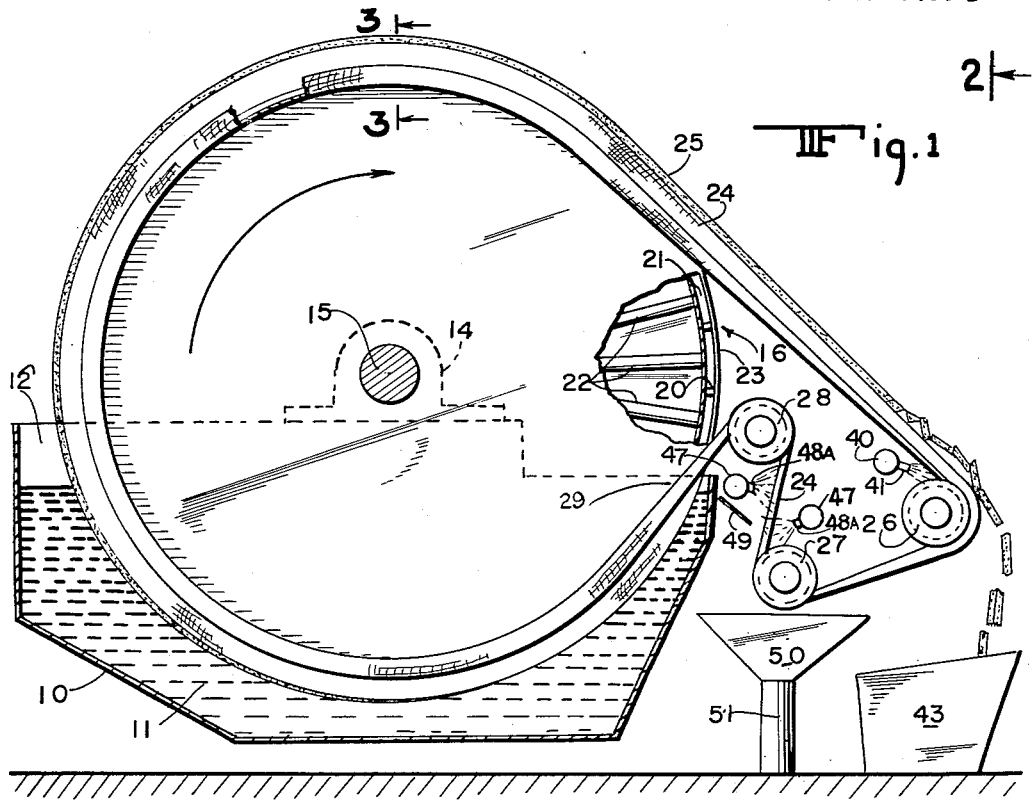
FIG. 1 is a sectional elevational view taken substantially along line 1—1 of FIG. 2, and showing a filter to which the principles of the invention have been applied.

Referring to the drawings, and particularly to FIG. 1, the principles of the invention are shown as applied to a drum type conveyor comprising a tank 10 containing a slurry 11 to be filtered. The tank 10 may have an open top 12 and may include bearings 13 and 14 on opposite side walls thereof for journaling a shaft 15 for rotation about a horizontal axis. Referring to FIGS. 1 and 3, a drum 16 may be made up of imperforate end disks 17 about the periphery of which may extend an imperforate shell 18 of sheet metal or the like. A ring member 19 having a channel-shaped cross section may be rigidly attached to the periphery of shell 18 adjacent each end thereof.

Circumferentially spaced, parallel ribs 20 may extend between the ring members 19 forming shallow chambers 21 about the periphery of the drum 16, and a radial exhaust line 22 may provide communication between each chamber 21 and a valve means (not shown), which latter is connected to a source of subatmospheric pressure for exhausting each chamber only when it is submerged within the slurry 11 in tank 10, all as is well known in the art. A perforated member 23 may be provided about the drum 16 resting on, and fixed to, the tops of the ribs 20.

Referring to FIG. 1, a cloth belt 24 may extend about the periphery of the drum 16 for a maximum of wrap. The belt 24 may leave the drum 16 at a point 25, and pass about a portion of the periphery of a discharge roll 26. The belt 24 may then pass reversely around idler rolls 27 and 28, thence it may lead onto the drum 16 at the point 29.

The cloth belt 24 may be made of a woven textile material which may be cut from a bolt in sections 24', 24", etc., of a length substantially greater, and in the order of about eight to twelve inches longer than the length of the drum 16. The selvage edges of successive cut sections may be overlapped and joined together by any appropriate means, one of which is a tape sold under the trade name of "Velcro." Such tape overlapping each joint may be sewn or otherwise fastened at each joint of each succeeding fabric section to provide an endless belt arrangement.

Since the length of each section 24', etc., is greater than the length of the drum 16, the discharge roll 26 and the idle rolls 27, 28, the edges 30 of the continuous fabric belt 24 may overhang the ends of the drum 16, discharge roll 26 and idlers 27, 28. The extremities of the overlapping edges 30 may be reversed on themselves and sewn or otherwise fastened to provide a tubular seam 31. A resilient tensioning means 32 of a length substantially less than the length of the continuous belt 24 may be threaded through the tubular seam 31 and its ends may be drawn together and joined. The tensioning member 32 may comprise a close-wound spring made continuous through the use of a spring joiner at the ends to be joined. It may comprise a rubber or plastic tubing made continuous by inserting a grip-type stud into the tubing and binding the joint, or it may comprise a fabric woven cord made continuous by lacing or interweaving at the splice. It may also include reinforced plastic tubing that will freely slide within the tubular seams 31 to provide even transverse tensioning of the belt 24.

Referring to FIG. 3, a continuous resilient sealing ring 33 may be mounted within the channel of rings 19 on each end of the drum 16, and with a tensioning element 32 threaded through the tubular seams 31 on each edge of the belt 24 and joined together, the belt 24 snugly fits the drum 16, the discharge roll 26 and the idler rolls 27, 28. Furthermore, the sealing rings 33 are held in firm engagement with the fabric belt 24, thereby preventing pressure loss through the ends of drum 16. Additionally, the constant transverse tensioning of the fabric belt 24 by the tensioning members 32 restrains the formation of wrinkles within the belt.

Referring to FIG. 4, the discharge roll 26 may include flanges 34 and 35 at each end thereof, forming grooves 36 and 37 for the reception of the tensioning members 32 as the belt 24 passes over the roll 26. A left-hand spiral ridge 38 may be formed on the periphery of the roll 26, and it may extend from the middle of the roll to the left-hand end thereof. A righthand spiral ridge 39 may be formed on the periphery of drum 26, and it may extend from the middle of drum 26 to the righthand end thereof.

Referring to FIG. 1, a manifold pipe 40 may be mounted along an axis parallel with the axis of roll 26, and it may include one or more nozzles 41, the effectiveness of which extends throughout the width of belt 24. The location and arrangement of the nozzles 41 may be such as to direct a fluid, such as air under pressure, between the inner surface of the belt 24 and the periphery of the roll 26 at the point where the belt 24 passes onto the roll 26. As shown in FIG. 4, the air jets from nozzles 41 cause a rapid pulsation of the belt 24 as it passes over the roll 26, causing the accumulation of cake 42 to be crumbled and broken away from the belt 24, so that the broken pieces of cake fall into a hopper 43 (FIG. 1). While the discharge roll 26 has been shown and described as having spiral or helical ridges 38 and 39 on its peripheral surface, it may have a plain cylindrical surface in which case the air jets are entrapped between the belt and roll by virtue of the snugly fitting belt 24 that overlies each end of the discharge roll 26. Furthermore, the roll 26 may have a plane or undulated peripheral surface in which elongated orifices or the like may extend through the peripheral wall, which orifices may be supplied with pulsating jets of fluid from the interior of the roll 26. And, the roll 26 may or may not be driven although in the embodiment disclosed it is shown as driven by a variable speed transmission.

Figure 2:
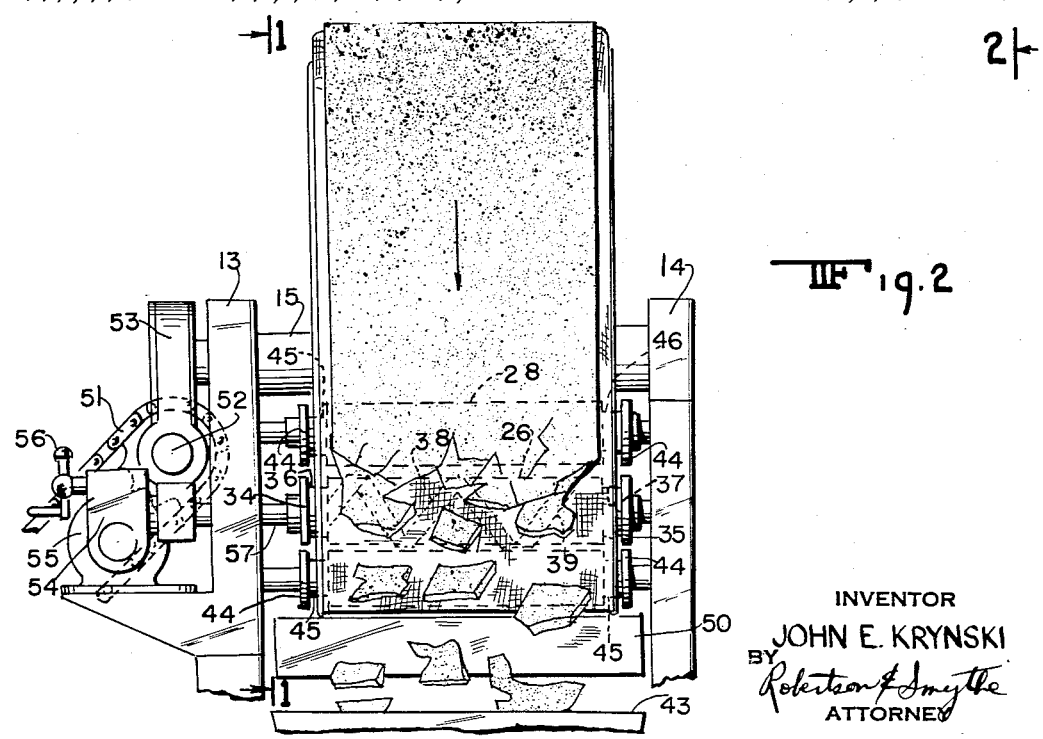
FIG. 2 is an end elevational view, looking in the direction of the arrows along line 2—2 of FIG. 1.

Referring to FIGS. 1 and 2, the idler rolls 27, 28 may include plain cylindrical surfaces. They also may include flanges 44 forming grooves 45, 46 for the reception of the tensioning member 32. A second wash is on back side of cloth. A manifold 47 (FIG. 1) may be mounted along an axis parallel with the axis of rolls 27, 28, and it may include one or more nozzles 48 directed toward the reach of belt 24 between rolls 27, 28. The effectiveness of the nozzles 48 preferably should extend throughout the width of the belt 24. A deflecting plate 49 may be located beneath the nozzles 48 for confining the fluid issuing from the nozzles 48. Water under pressure may be supplied to the manifold 47 for directing a water spray against the belt 24 on the surface thereof from which the accumulated cake has been removed. The residue from this washing action may be collected within a hopper 50 having a line 51 leading to a drain. Referring to FIG. 2, a power drive may be provided to rotate the drum 16. It may comprise a chain 51 driven by a motor (not shown). The chain 51 may drive a worm 52 through a sprocket. The worm 52 may mesh with a worm gear 53 fixed to shaft 15 to which drum 16 is attached.

A variable speed transmission 54 may be driven by a motor 55. The transmission 54 may include an operator 56 for varying its output speed. The output from transmission 54 may be connected to a shaft 57 to which the discharge roll 26 is attached. It is apparent that adjustment of the operator 56 will vary the peripheral speed of the discharge roll relative to the peripheral speed of the belt 24. Thus, by causing the peripheral speed of the discharge roll 26 to be in excess of the linear speed of the belt 24, the spiral ridges 38 and 39 will tend to transversely urge the cloth material of belt 24 from each side of its medial line in opposite directions, thereby avoiding the formation of wrinkles in the belt 24.

Although the various features of the new and improved drum and belt filter have been shown and described in detail to fully disclose one embodiment of the invention, it will be evident that changes may be made in such details and certain features may be used without others without departing from the principles of the invention.

What is claimed is:

In a drum type filter, a drum mounted for rotation about a horizontal axis; a discharge roll mounted for rotation about a horizontal axis parallel with said drum axis; an endless cloth belt surrounding a substantial portion of the periphery of said drum and discharge roll, and sealingly engaging the drum adjacent the edges of said drum, said cloth belt having a width transversely substantially greater than the width of said drum and roll and having its edges overhanging freely from the edges of said drum and extending radially inwardly a substantial distance from said drum edges, said overhanging edges having seam means therealong, resilient tensioning means of less length than the length of said belt arranged within said seam means for drawing the latter taut across the entire width of said drum and holding the same thereon.

References Cited in the file of this patent
UNITED STATES PATENTS

| | | |
|---|---|---|
| 2,812,064 | Siebenthal | Nov. 5, 1957 |
| 2,963,161 | Holland | Dec. 6, 1960 |
| 3,017,997 | Hawkes et al. | Jan. 23, 1962 |